United States Patent [19]

Kalivas

[11] 4,285,023
[45] Aug. 18, 1981

[54] RECTIFIER SYSTEM WITH FAILURE ALARM CIRCUITRY

[75] Inventor: Zissis Kalivas, Lorain, Ohio

[73] Assignee: Lorain Products Corporation, Lorain, Ohio

[21] Appl. No.: 129,355

[22] Filed: Mar. 11, 1980

[51] Int. Cl.³ .................... H02H 3/20; G08B 21/00
[52] U.S. Cl. ........................................ 361/91; 323/248;
340/645; 340/662; 361/79; 363/75
[58] Field of Search .................. 340/645, 662; 361/79,
361/1, 104, 91; 323/50, 57; 363/52, 53, 75

[56] References Cited

U.S. PATENT DOCUMENTS

| | | | |
|---|---|---|---|
| 2,574,374 | 11/1951 | Bivens | 361/79 X |
| 3,047,848 | 7/1962 | Johnson | 363/53 X |
| 3,222,575 | 12/1965 | Dexter | 323/57 X |
| 3,590,362 | 6/1971 | Kakalec | 362/75 X |
| 3,626,248 | 12/1971 | Bartlett | 361/1 |
| 3,816,809 | 6/1974 | Kuster | 361/91 X |
| 3,824,449 | 7/1974 | Hase | 323/57 X |
| 3,894,280 | 7/1975 | Bishop et al. | 363/75 |
| 4,068,157 | 1/1978 | Bassett | 363/75 |
| 4,159,514 | 6/1979 | Kakalec | 363/53 |

OTHER PUBLICATIONS

Subsection 1.1, pp. 1–8, Subsection 1.2, pp. 1–8, Subsection 1.3, pp. 1–3 from "1979 Telecommunications Power Equipment Seminar", published by Lorain Products Corporation.

*Primary Examiner*—John W. Caldwell, Sr.
*Assistant Examiner*—Daniel Myer
*Attorney, Agent, or Firm*—Linn J. Raney; Michael M. Rickin

[57] ABSTRACT

A rectifier unit for supplying power to a D.C. load including a transformer having a primary, a secondary and a saturable core, the secondary defining an output section and a control section. A ferroresonance control circuit simulates saturation of the transformer core and includes an electronic switch for controlling the degree of simulated core saturation and thereby regulating the rectifier unit output. Rectifier failure alarm circuitry produces a failure alarm in response to a number of rectifier unit malfunctions. The rectifier failure alarm circuitry is coupled to the ferroresonance control circuitry and comprises a rectifier alarm element operable between the first condition wherein a rectifier failure alarm is produced and a second condition. The failure alarm element is operated from its first condition when the electronic switch minimizes the rectifier system output. The failure alarm element is provided with power from the secondary output section so that, if this output section fails to produce power, a rectifier failure alarm is also produced.

14 Claims, 2 Drawing Figures

RECTIFIER SYSTEM WITH FAILURE ALARM CIRCUITRY

BACKGROUND OF THE INVENTION

1. Field of the Invention

The present invention relates to D.C. power supplies employing controlled ferroresonant transformers and more particularly to the provision of failure alarms in such systems.

So-called ferroresonant power transformers consist of an iron core upon which separate primary and secondary coils are wound and separated from each other by magnetic shunts in the core. The magnetic shunts cause some of the flux induced by the primary to be diverted from the secondary resulting in a certain amount of isolation between the primary and secondary windings. The shunts also allow the magnetic flux levels in the respective core sections associated with the primary and secondary to be different in both amplitude and phase. The secondary of such a transformer is connected across a suitably selected capacitor so that the secondary and the capacitor form an oscillator circuit, commonly referred to as a "tank circuit". When sufficient A.C. voltage is applied to the primary of such a transformer, the transformer abruptly assumes a condition called ferroresonance, in which oscillations in the tank circuit cause the secondary transformer core section to experience A.C. flux saturation.

When the secondary core section is saturated a portion of the voltage provided across the secondary can be tapped off, rectified and filtered to produce a source of relatively constant D.C. voltage for supplying a D.C. load. Within limits, changes in the A.C. voltage and/or frequency input to the transformer change only the saturation level of the core and produce relatively small changes in output voltage to the D.C. load. Increasing the D.C. load, within limits, drains energy from the tank circuit and reduces the saturation of the core but also results in only a small change in D.C. output voltage.

Thus, so long as the transformer secondary core section remains saturated, the D.C. output voltage remains relatively constant regardless of fluctuations in the load and in the power supply voltage and frequency; however, if the input voltage or frequency is reduced below a predetermined value, or if the load increases sufficiently, the energy in the tank circuit is not sufficient to maintain the transformer core saturated and the output voltage to the load drops precipitately.

The disadvantages of the ferroresonant power transformer arrangement referred to are that the degree of D.C. output voltage regulation is dependent upon the magnetic characteristics of the transformer core material and thus cannot be controlled with precision; the output voltage is determined by the number of turns tapped from the transformer secondary and cannot be easily changed; the output voltage from the rectifier is dependent upon changes in the frequency of input power to the transformer; and, the load at which the output voltage drops precipitately is highly sensitive to changes in the transformer input voltage.

The foregoing disadvantages were largely overcome by the development of so-called controlled ferroresonant power supplies. These included ferroresonance control circuitry associated with essentially the same transformer and tank capacitor arrangement referred to previously. The ferroresonance control circuitry enabled the impedance of the tank circuit to be controllably altered thus permitting the tank circuit to variably simulate saturation of the secondary core section.

The ferroresonance control circuits provided for a variable impedance in parallel with the tank capacitor to alter the impedance of the tank circuit. The variable impedance was commonly formed by an inductor and an electronic switch which switched the inductor in and out of the tank circuit electronically in a controlled fashion to controllably alter the impedance of the tank circuit to simulate saturation of the transformer core. By thus simulating saturation of the transformer core so that the voltage across the tank capacitor was normally less than the minimum which would have existed with the heaviest expected load and the lowest expected input voltage and frequency, the output voltage was controlled electronically and could be made to be essentially independent of input voltage and frequency, load current and the magnetic characteristics of the core itself.

In a typical application, two or more controlled ferroresonant rectifier units have been connected across a load in parallel with a battery. The rectifier units operated to share the load and maintain the battery charge level. In the event of a power interruption to the rectifier units the battery provided a temporary power supply for the load. If one of the rectifier units malfunctioned, the load was distributed among the remaining rectifier units. In the latter event a rectifier failure alarm was produced so that the existence of the malfunction was brought to the attention of the equipment user.

2. The Prior Art

Controlled ferroresonant power supplies were provided with various accessory circuits which individually sensed different failure modes of the power supplies and produced failure alarm signals. These included low current alarm circuits and high voltage shutdown circuits.

The high voltage shutdown circuits sensed the existence of a voltage across the rectifier unit output terminals which exceeded a predetermined set point value. This condition was indicative of a rectifier unit failure. The high voltage shutdown circuits commonly interrupted the supply of power to the rectifier unit by means of a resettable circuit breaker.

The low current alarm circuits were employed to determine when the rectifier unit output was minimized, thus indicating a failure of some sort in the unit. To accomplish this the low current alarm circuits sensed the rectifier unit output current and when that current reached a predetermined minimum value (generally 0.5% of full load current) a rectifier failure alarm was produced. Current sensing was typically accomplished by the use of a current shunting device from which a signal was derived and amplified to control operation of an alarm producing device. These circuits produced failure alarms when load levels were low but without any actual rectifier malfunction occurring. The low current alarm circuits had to be constructed to respond to arbitrary low current levels because of the difficulty in sensing and responding to extremely small rectifier output currents.

SUMMARY OF THE INVENTION

The present invention provides a new and improved rectifier unit employing a ferroresonance control circuit for simulating transformer core saturation to govern the rectifier unit output wherein a rectifier failure alarm element is operated to produce a rectifier failure alarm in response to a sensed ferroresonance control circuit condition causing the rectifier unit output to be substantially minimized.

The ferroresonance control circuit includes an electronic controller which is operated in response to conditions sensed at the rectifier unit output to cause variable simulation of transformer core saturation. Detector circuitry is coupled between the ferroresonance control circuit and the failure alarm element so that operation of the failure alarm element is governed in accordance with a detected condition of the ferroresonance control circuit. In one preferred embodiment of the invention the electronic controller includes an electronic switch operated between conductive and nonconductive conditions to control the impedance of the ferroresonance control circuit in response to sensed voltage and current values at the rectifier unit output. When the electronic switch is fully conductive the rectifier unit output is minimized. The detector circuitry senses when the switch is substantially fully conductive and operates the failure alarm element to cause production of a rectifier failure alarm.

The preferred failure alarm element is electrically energized and is fail safe in that when it is deenergized a failure alarm is provided. In one preferred embodiment of the invention the element is connected to and energized from the secondary of the rectifier unit transformer so that when the transformer secondary is ineffective a failure alarm is provided regardless of the sensed condition of the ferroresonance control circuitry.

A rectifier unit constructed according to the invention includes a high voltage shutdown circuit which is capable of sensing voltage values above a predetermined value at the rectifier unit output and terminating operation of that rectifier unit. The failure alarm element is effective to enable and disable the high voltage shutdown circuits so that the rectifier unit operation is only shut down when high voltage is sensed at the rectifier unit output and when the failure alarm element is not conditioned to provide a failure alarm.

When two or more rectifier units embodying the invention supply power to a common load and one of the rectifiers malfunctions to produce an excessive output voltage, the malfunctioning rectifier unit is shut down and the load is supplied by the remaining rectifier unit or units. As soon as the malfunctions causes excessive output voltage, the malfunctioning rectifier unit supplies current to the load while inhibiting the remaining rectifier units from supplying any load current. The high voltage shutdown circuits of each rectifier unit sense the excessive voltage at the respective rectifier outputs; but since the inhibited rectifier units supply no load current their respective ferroresonance control circuits are conditioned to minimize the rectifier unit output and the failure alarm element of each of these is conditioned to produce a failure alarm. Since the malfunctioning rectifier unit supplies current to the load its failure alarm element is not conditioned to produce an alarm. This conditioning of the failure alarm elements in the rectifier units results in the high voltage shutdown circuitry of the malfunctioning rectifier unit shutting down that rectifier unit while the high voltage shutdown circuits in the remaining rectifiers are disabled by their respective associated failure alarm elements.

When the malfunctioning rectifier unit is shut down the output voltage returns to normal and the remaining rectifier units supply the load. The failure alarms produced by the properly functioning rectifier units are of only momentary duration extending from the time the excessive voltage is sensed to the time the malfunctioning rectifier unit shuts down. Shutting down the malfunctioning rectifier unit results in production of a failure alarm attributable to that rectifier unit.

Additional features and advantages of the invention will become apparent from the following detailed description of a preferred embodiment made with reference to the accompanying drawings which form part of the specification.

DESCRIPTION OF A PREFERRED EMBODIMENT

Figure 1:
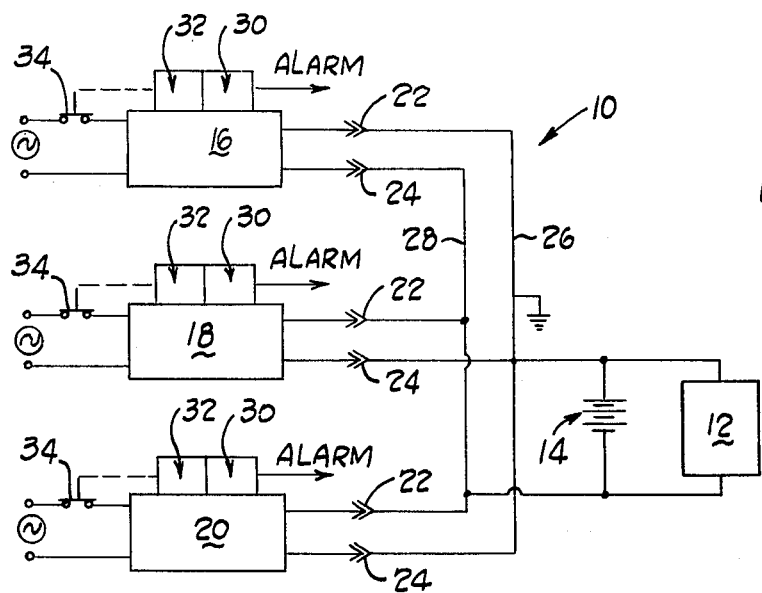
FIG. 1 is a schematic illustration of a direct current power supply system constructed in accordance with the present invention; and, FIG. 2 is a schematic illustration of a rectifier unit forming part of the system of FIG. 1.

FIG. 1 illustrates a power supply system 10 for a D.C. load 12 in which the load 12 is connected across the terminals of a rechargeable battery 14 and across the output terminals of three parallel connected rectifier units 16, 18 and 20, respectively. As illustrated by FIG. 1, each rectifier unit includes output terminals 22, 24 which are electrically connected to respective busses 26, 28 which in turn are connected to respective terminals of the battery 14 and the load 12.

A typical application of a system like the system 10 is in communications systems, such as telephone equipment which utilizes D.C. power and must remain operative in the event of power failures. Although the preferred embodiment of the invention is illustrated and described in the context of a power supply system employing multiple rectifier units, it should be understood that the invention is applicable to systems employing a single rectifier unit.

The rectifier units 16, 18, 20 each have input terminals connected to a source of single or multiple phase alternating current power and each is constructed and arranged so that the load 12 is shared substantially equally by the rectifier units. Accordingly, when the system 10 functions in a normal fashion each rectifier unit produces substantially one third of the load current and the units all operate at substantially identical output voltage levels.

In the event that any one of the rectifier units 16, 18, 20 should malfunction in some manner the remaining, properly functioning, rectifier units automatically share the load and maintain the battery 14 charged while a rectifier failure alarm, indicating the identify of the malfunctioning rectifier unit, is produced so that the system user can effect repairs. Each of the rectifier units therefore is provided with rectifier unit failure alarm circuitry 30 which functions to provide a failure alarm indicative of a malfunction of its associated rectifier unit.

In the event a rectifier unit should malfunction by failing to supply the requisite voltage level at its output terminals, operation of that rectifier is inhibited by the remaining two rectifiers since they produce a higher output voltage than the malfunctioning rectifier. The malfunctioning rectifier unit thus fails to produce output current, a condition which is sensed by the rectifier failure alarm circuitry 30 so that a rectifier failure alarm is produced.

In the event any rectifier unit malfunctions in such a way as to produce an excessively high output voltage level the existence of the excessively high voltage is sensed by a high voltage such down circuit 32 associated with that rectifier unit. The high voltage shut down circuit 32 opens a circuit breaker 34 between the malfunctioning rectifier unit and its A.C. power supply. Shutting down the malfunctioning rectifier unit results in the production of a rectifier failure alarm by the associated failure alarm circuitry 30.

The power supplied by the rectifier units 16, 18, 20 maintains the battery 14 fully charged while supplying the load 12. Accordingly, in the event of an interruption of the alternating current power to all the rectifier units the load 12 is automatically supplied, on a temporary basis, by the battery 14. The rectifier failure alarm circuits 30 cause the production of rectifier failure alarms when this occurs.

Figure 2:
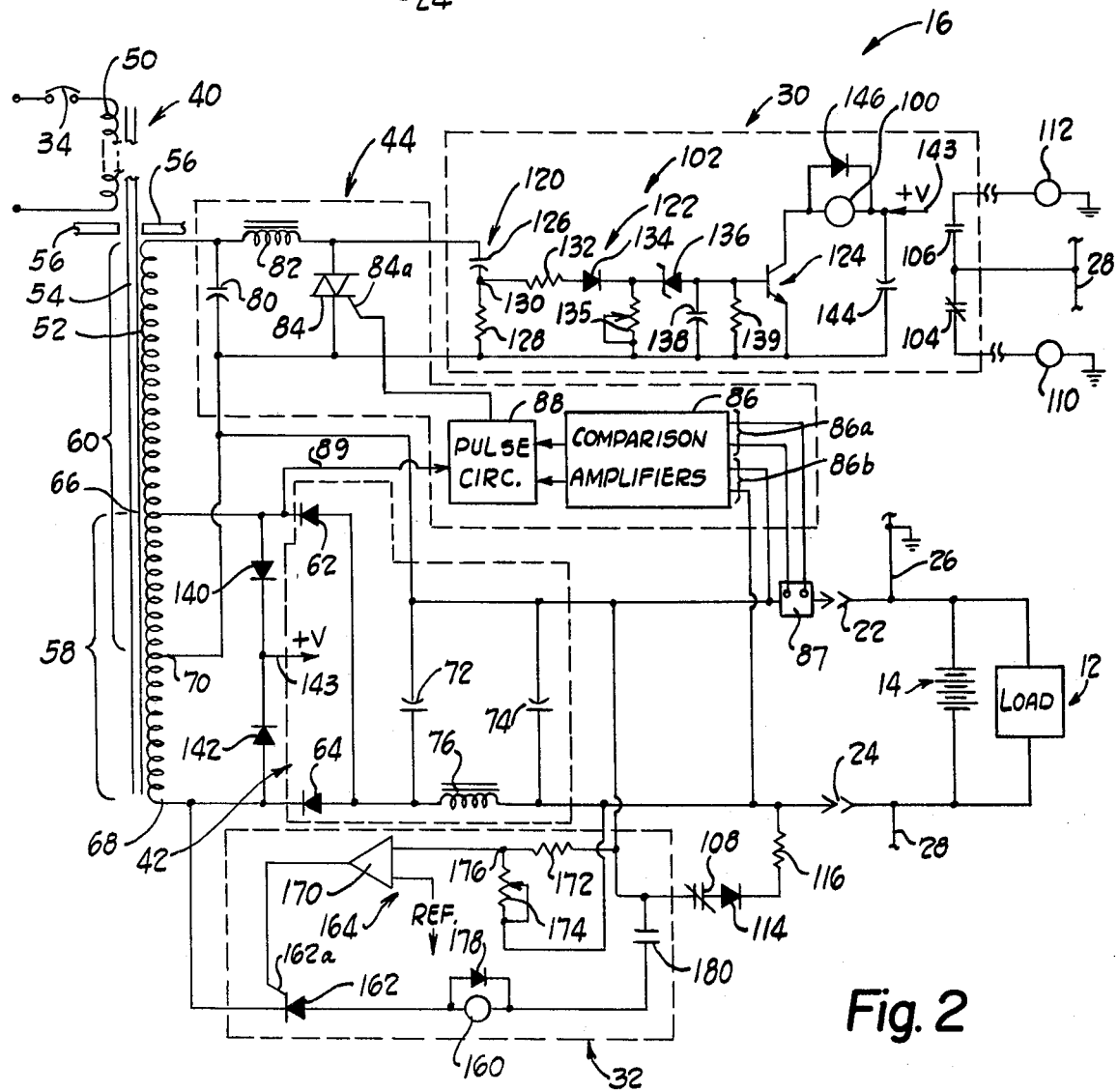

Referring now to FIG. 2, a schematic illustration of the rectifier unit 16 with its associated failure alarm circuitry 30 and high voltage shut down circuitry 32 is schematically illustrated. The rectifier unit 16 includes a transformer 40, rectification and filter circuitry 42 associated with the transformer for producing full wave rectified filtered output power from the unit, and ferroresonance control circuitry 44 for regulating the rectifier unit output.

The transformer 40 is of the so-called ferroresonant type and includes a primary 50, a secondary 52, an iron core 54 upon which the primary and secondary are separately wound, and magnetic shunts 56 (schematically illustrated) for diverting some of the flux induced by the primary from the secondary resulting in a certain amount of isolation between the primary and secondary. The magnetic shunts also cause the magnetic flux levels in the transformer core sections upon which the individual windings are disposed to be different in both amplitude and phase. The secondary winding 52 is provided with taps which form a secondary power section 58 and a secondary control section 60.

The rectification and filter circuitry 42 is connected to the secondary power section 58 to provide full wave rectified, filtered output power at the output terminals 22, 24. The circuitry 42 includes a full wave rectifier formed by rectifier diodes 62, 64 which are connected to the respective end taps 66, 68 of the secondary power section 58. The diodes 62, 64 are poled so that the secondary power section center tap 70 is positive with respect to the end taps. The circuitry 42 also includes a filter formed by capacitors 72, 74 and a choke coil 76. The filter is connected across the output of the full wave rectifier so that full wave rectified, filtered direct current power is supplied across the rectifier output terminals 22, 24.

The ferroresonance control circuitry 44 functions to variably simulate saturation of the transformer core 54 and thus control the output power from the rectifier unit. The ferroresonance control circuitry 44 includes the transformer secondary control section 60, a tank capacitor 80 connected in parallel with the secondary control section 60 to form a resonant tank circuit and controller circuitry for enabling the ferroresonance control circuitry 44 to variably simulate saturation of the core 54 and thus govern the rectifier unit output.

In the preferred embodiment of the invention the controller circuitry includes an inductor 82 in the form of a coil connected in parallel with the tank capacitor 80 and an electronic controller switch 84 rendered conductive by the presence of a control signal pulse at a gate electrode 84a. In the preferred and illustrated embodiment the electronic switch is formed by a triac which is capable of being rendered conductive at a desired time during each A.C. power supply half cycle (i.e. at a desired power supply "phase angle") to variably control conduction through the inductor 82, thus altering the impedance of the tank circuit simulating saturation of the transformer core 54. By simulating saturation of the transformer core so that the voltage across the tank capacitor 80 is normally less than the minimum that would be experienced with the heaviest load and lowest expectable A.C. input voltage and frequency, the rectifier unit output voltage can be controlled electronically by operation of the switch 84. The rectifier output can thus be made essentially independent of normally expectable changes in A.C. input voltage and frequency; changes in the load current; and magnetic characteristics of the core itself.

By rendering the switch 84 conductive at a desired time during each power supply half cycle the average tank capacitor voltage can be changed and thus the rectifier output voltage made lower or higher depending on the power supply phase angle at which the switch 84 is rendered conductive. When the switch 84 is fully conductive (i.e. conductive substantially throughout each power supply half cycle) the impedance of the tank circuit is altered so that the power output from the rectifier unit is minimized. When the switch 84 is nonconductive throughout each power supply half cycle the power output from the rectifier unit is maximized.

Accordingly, the controller circuitry further includes drive circuitry coupled between switch gate 84a and the rectifier output for operating switch 84 in response to sensed conditions at the rectifier unit output. In the illustrated and preferred embodiment of the invention the drive circuitry includes comparison amplifier circuitry 86 responsive to sensed conditions at the rectifier output and pulse generating circuitry 88 controlled by the comparison amplifier circuitry 86 to provide pulses to the switch gate 84a to render the switch conductive at power supply phase angles determined by the comparison amplifier output signals.

The comparison amplifiers 86 have one input 86a for receiving an input signal which varies according to the load current produced by the rectifier unit 16 and a second, voltage-responsive input 86b connected across the output lines of the rectifier unit 16. The current responsive unit 86a is connected to a conventional shunt circuit 87 in series with the rectifier output terminal 22 so that the current signal input to the comparison amplifiers is indicative solely of the load current delivered by the associated rectifier unit 16. The comparison amplifier circuitry is constructed and arranged so that when the current produced by the rectifier unit 16 exceeds a predetermined value, e.g., 110% of nominal full load current supplied by the rectifier unit, the current responsive output of the comparison amplifier circuitry 86 is solely effective to control operation of the pulse circuitry 88. When the sensed current rises above the predetermined level the current responsive output from the comparison amplifiers conditions the pulse generating circuitry 88 to reduce the conductivity of the switch 84 and thereby increase the output power provided from the unit 16. When the rectifier unit output current is less than the predetermined value the current responsive comparison amplifier circuitry is ineffective to control operation of the switch 84.

The voltage responsive comparison amplifier circuitry is effective to control the conductive condition of the switch 84 via the pulse generating circuitry 88 in response to sensed voltage across the rectifier unit output whenever the rectifier unit output current is less than the predetermined value. When the voltage sensed across the output of the rectifier unit 16 rises above its nominal level the voltage responsive comparison amplifier circuit produces the output signals which increase the conductivity of the switch 84 to reduce the power output from the rectifier unit 16. When the voltage across the output terminal of the rectifier unit 16 rises above a predetermined value, the output from the voltage comparison amplifier circuit to the pulse generating circuit 88 is sufficient to render the switch 84 fully conductive so that the power output from the rectifier unit 16 is minimized.

As indicated above, when the output current from the rectifier unit 16 exceeds a predetermined level, the comparison amplifier circuitry 86 functions so that the voltage responsive output signal from the comparison amplifier circuit 86 is suppressed and the current responsive signal controls operation of the pulse generating circuitry 88 regardless of the sensed voltage across the rectifier unit output terminals.

One or the other output signals from the comparison amplifier circuitry 86 is input to the pulse generating circuit 88 along with a synchronizing signal which is fed to the pulse generating circuit 88 from the transformer power section 58 on a line 89. The signals are processed by the pulse generating circuitry 88 which then provides pulses to the switch gate 84a to render the switch conductive at a power supply phase angle determined by the signal value input to the pulse generating circuitry.

Rectifier units employing the transformer 40, rectification and filter circuitry 42 and ferroresonance control circuitry 44 of the types thus far described are commercially available from Lorain Products Corporation and are known as Lorain RL and RJ series "FLOTROL" rectifiers.

In accordance with the present invention the rectifier failure alarm circuitry 30 is coupled to the ferroresonance control circuitry 44, detects a ferroresonant control circuit condition in which the rectifier unit output is minimized and produces a rectifier failure alarm in response to that condition. The circuitry 30 includes a rectifier failure alarm element 100, operable between a first condition in which a failure alarm is produced and a second condition, and detector circuitry 102 coupled between the alarm element 100 and the ferroresonance control circuit to control the condition of the element 100.

In the preferred and illustrated embodiment the rectifier failure alarm element 100 is formed by a relay coil having associated contacts 104, 106, 108. When the relay 100 is in its first condition it is deenergized and the contacts 104, 108 are closed to produce remote and local failure alarms. The contacts 104 close to produce a remote failure alarm by energizing an alarm device 110 connected in series with the contacts 104 across the battery 14. The alarm device can be formed by a horn and/or a light or any other suitable alarm device. The contacts 108 are connected in series with a light emitting diode 114 and an associated resistor 116 across the rectifier unit output. The light emitting diode 114 is preferably mounted on a panel of the rectifier unit and readily visible to the equipment user.

When the rectifier unit 16 is operating normally the relay 100 is energized and the contacts 106 are closed to produce a remote signal indicative of proper operation of the rectifier unit. The contacts 106 are connected across the battery and in series with a remote signaling device 112 (schematically illustrated) such as a lamp.

The failure alarm element 100 is fail-safe in that a failure in the alarm circuitry which results in deenergization of the element 100 produces a rectifier failure alarm.

The detector circuitry 102 is formed by a sensing circuit 120 connected across the switch 84 for developing a condition signal indicative of the conductive condition of the switch, a signal processing circuit 122 and a failure alarm element controller 124. The processing circuit 122 delivers signals produced by the sensing circuit 120 to the failure alarm element controller 124 which controls the condition of the element 100 in response to signals from the sensing circuit.

The preferred sensing circuit 120 comprises a series connected capacitor 126 and resistor 128 which are connected in parallel with the electronic switch 84. The capacitor 126 and resistor 128 coact to produce a condition signal at a signal output junction 130 between them, the signal having an average value which reflects the conductive condition of the electronic switch 84. When the switch 84 is fully conductive the average value of the signal provided at the output junction 130 is quite low. The average signal value increases to a maximum when the electronic switch 84 is nonconducting.

The signal processing circuitry 122 includes a voltage dropping resistor 132, a rectifier diode 134 and a signal level adjusting potentiometer 135 which transmit the signal from the junction 130 to the cathode of a zener diode 136. When the voltage level at the zener diode cathode reaches a predetermined level the zener diode is rendered conductive and the signal is delivered to the control electrode of the controller 124. The level adjusting potentiometer 135 enables calibration of the signal processing circuit 122 so that the zener diode is rendered conductive when the condition signal at the output junction 130 reaches a preset value.

The controller 124 functions as a switch which enables and prevents energization of the relay 100. The controller 124 is illustrated as an NPN transistor which is rendered conductive to enable energization of the element 100 when a condition signal is delivered to its control electrode via the zener diode. In the absence of a signal at its central electrode the transistor is non-conductive and prevents energization of the relay 100. Other forms of controller could be employed, such as an operational amplifier.

A capacitor 138 and resistor 139 are individually connected across the base-emitter junction of the transistor 124 to provide sustaining base-emitter current to the transistor in the event the signal level at the junction 130 should momentarily be reduced below the voltage level at which the zener diode 136 conducts.

During normal operation of the rectifier unit, i.e., when the electronic switch 84 is either nonconducting or conducting during part of each power supply half cycle, the controller 124 is conductive so that the element 100 remains energized. However, when the electronic switch 84 becomes substantially fully conductive, a condition indicative of malfunction of the rectifier unit, the controller 124 is rendered nonconducting and deenergizes the relay 100 to produce a failure alarm.

In the illustrated and preferred embodiment of the invention the relay 100 is energized from the transformer secondary power section 58 so that if the secondary power section fails to produce power for any reason the element 100 is deenergized and a rectifier failure alarm is produced. The element 100 is connected to the secondary power section 58 via rectifier diodes 140, 142 which are connected to the end taps 66, 68 and are poled to deliver full wave rectified direct current to the failure alarm element 100 via a line 143. The voltage on the line 143 is positive with respect to the voltage at the secondary power section center tap 70 through which the energizing circuit for the relay 100 is completed.

A capacitor 144 connected in parallel with the relay 100 supplies sustaining current when the voltage applied to the relay would otherwise momentarily be too low to maintain the relay pulled in. A diode 146 is connected in parallel with the relay 100 and poled to protect the controller 124 from inductive kicks which might otherwise be experienced when the relay 100 is deenergized.

The rectifier failure alarm circuitry 30 produces a failure alarm in the event any of the following occurs: (1) If there is a malfunction in the ferroresonance control circuitry 44 causing the switch 84 to be rendered substantially fully conductive; (2) if the switch 84 itself should be short circuited or fail in its fully conductive condition; (3) if the voltage across the rectifier unit output terminals reaches a predetermined value greater than the nominal operating level; and, (4) if the A.C. input power is interrupted or the secondary power section 58 otherwise fails to produce power.

A particular advantage of the circuitry 30 is that it is not required to respond to sensed rectifier unit output current having low values and thus is not necessarily operated to produce a failure alarm when the rectifier unit is operating properly and supplying current to the load at less than an arbitrarily determined low value.

The high voltage shutdown circuitry 32 detects the presence of voltage above a predetermined level across the output of the rectifier unit and, when the rectifier unit is otherwise operating normally, shuts down the rectifier unit by opening the circuit breaker 34. Once opened, the circuit breaker 34 must be "reset", either manually or by some other agency, before the rectifier unit 16 can be reactivated. In the preferred embodiment the high voltage shutdown circuitry includes a circuit breaker actuator 160 connected across the output of the rectifier unit in series with an electronic switch 162 which is rendered conductive by a high voltage detection circuit 164. The circuit breaker actuator 160 is preferably formed by a relay coil while the illustrated switch 162 is formed by a thyristor having its gate electrode 162a connected to the high voltage detection circuit 164.

The high voltage detection circuit 164 is connected between the positive rectifier output terminal 22 and the thyristor gate 162a and includes a comparator 170 having one input terminal receiving a voltage responsive signal from the rectifier unit output and its other input terminal connected to a reference voltage source. The comparator input from the rectifier unit is conditioned by a voltage divider formed by a fixed resistor 172 and a set point calibration potentiometer 174 which coact to provide a comparator input signal at a voltage divider output junction 176. The signal at the junction 176 follows the rectifier output voltage and when the voltage across the rectifier unit output terminals exceeds a predetermined level the signal input to the comparator 170 from the junction 176 differs from the reference voltage sufficiently that the comparator 170 produces an output which renders the thyristor 162 conductive. This in turn enables energization of the relay 160 to actuate the circuit breaker 34 and shut down the rectifier unit. A diode 178 connected in parallel with the relay 160 protects the thyristor 162 from inductive kicks resulting from deenergization of the relay 160.

Where, as in the illustrated embodiment of the invention, multiple rectifier units supply power to the same load, the production of excessively high output voltage by one malfunctioning rectifier unit results in the remaining rectifier units being inhibited (i.e. failing to supply load current) and the excessively high voltage appears across the outputs of the inhibited units. The existence of excessively high voltage at the outputs of all the rectifier units is a condition which could cause all the rectifier units to be shut down by their respective high voltage shut down circuits unless some provision is made for selectively shutting down only the malfunctioning rectifier unit.

In the preferred embodiment of the invention the rectifier failure alarm circuitry 30 coacts with the high voltage shutdown circuitry to assure selective shutting down of the malfunctioning rectifier unit which produces the excessive output voltage. Selective shutting down is accomplished by rectifier failure alarm relay contacts 180 which are connected in series with the high voltage shutdown relay 160. The contacts 180 are open when the failure alarm relay 100 is conditioned to produce a failure alarm. Thus, although the high voltage shutdown circuit 32 detects the excessive voltage level at the rectifier unit output terminals and the thyristor 162 is conditioned to conduct, the shut down circuit is ineffective to open the circuit breaker 34 so long as the associated rectifier failure alarm circuit is conditioned to produce a failure alarm. When the failure alarm relay 100 is energized, i.e. conditioned to indicate normal rectifier unit operation, the contacts 180 are closed and the energizing circuit for the high voltage shutdown relay can be completed.

Selective shutting down of a rectifier unit which malfunctions by producing excessive voltage occurs as follows. When the malfunctioning rectifier unit begins producing excessive voltage levels the remaining rectifier units are inhibited by the high voltage at their output terminals and cease supplying load current. The malfunctioning rectifier unit thus supplies all of the current to the load and supplies charging current to the battery 14. The excessive voltage level sensed at the outputs of the inhibited rectifier units results in the electronic switch 84 of each inhibited rectifier unit being operated to its fully conductive condition. This condition is detected by the rectifier failure alarm circuitry 30 which immediately operates to deenergize the relay element 100 which, in turn, opens the contacts 180 so that the high voltage shutdown circuitry is disabled from shutting down these rectifier units.

Meanwhile the malfunctioning rectifier unit supplies all the load current and charges the battery 14. Accordingly the output current from the malfunctioning rectifier will always be sufficiently great that its rectifier failure alarm circuitry 30 remains conditioned to indicate proper operation. This is because the controller switch 84 is driven solely from the output of the current responsive comparison amplifier circuitry 86 which conditions the switch 84 to maximize the output of the malfunctioning rectifier unit. Accordingly the failure alarm relay 100 of the malfunctioning relay unit remains energized and the relay contacts 180 remain closed. This condition of the failure alarm relay contacts 180 enables the high voltage shutdown circuitry 32 of the malfunctioning rectifier unit to open the associated circuit breaker 34 so that the malfunctioning rectifier unit is shut down.

Shutting down the malfunctioning rectifier unit interrupts the power supplied to its failure alarm relay 100 and thus conditions that relay to produce a failure alarm corresponding to that rectifier unit. When the malfunctioning rectifier unit ceases to produce excessive output voltage as a result of shutting down, the remaining rectifier units immediately begin supplying load current at the nominal operating voltage level. The failure alarm circuitry associated with these rectifier units is immediately conditioned to again indicate proper rectifier unit operation resulting in the cessation of failure alarms attributable to those rectifier units as well as enabling operation of their associated high voltage shutdown circuits.

In practice the failure alarm circuitry and the high voltage shutdown circuitry of each rectifier unit are calibrated so that the failure alarm circuitry always responds to the sensed excessive voltage more quickly than does the high voltage shutdown circuitry. Thus, when one rectifier unit malfunctions by producing excessive voltage, the failure alarm circuitry of the properly functioning rectifier units produce momentary failure alarms which are discontinued when the malfunctioning rectifier unit shuts down.

Selective shutting down of a rectifier unit which produces excessive voltage occurs in the manner described regardless of the particular malfunction which has occurred. Typical reasons for a rectifier unit malfunctioning in this manner are that the electronic control switch 84 fails "open," i.e. in its nonconductive condition, or that the electronic control switch 84 fails to receive any gate pulses, resulting in the switch remaining in its nonconductive condition. Both of these malfunctions result in the rectifier unit output being maximized irrespective of the load.

While a single preferred embodiment of the invention is illustrated and described in considerable detail, the invention is not to be considered limited to the precise construction disclosed. Various adaptations, modifications and uses of the invention will become apparent to those skilled in the art to which the invention relates and the intention is to cover all such adaptations, modifications and uses which come within the spirit or scope of the appended claims.

What is claimed is:

1. In a rectifier unit having a ferroresonant transformer and an associated ferroresonance control circuit for simulating saturation of the transformer core to control the rectifier output, the ferroresonance control circuit comprising a transformer secondary section and circuit elements coacting with said transformer secondary section to simulate saturation of said transformer core, said circuit elements including an electronic controller element operable to alter the impedance of said ferroresonance control circuit and thereby govern the rectifier unit output;

(a) a rectifier failure alarm element operable between a first condition wherein a failure alarm is produced and a second condition; and, (b) detector circuitry coupled between said ferroresonance control circuit and said failure alarm element, said detector circuitry effective to detect a ferroresonance control circuit condition wherein the rectifier output is minimized and to effect operation of said alarm producing element to its first condition for producing a failure alarm.

2. The rectifier unit claimed in claim 1 wherein said electronic controller element comprises an electronic switch operable between conductive and nonconductive conditions in response to voltage and current values sensed at the rectifier unit output, said detector circuitry connected to said electronic switch and effective to operate said alarm producing element in response to the electronic switch condition.

3. The rectifier unit claimed in claim 1 wherein said rectifier unit further comprises a second section of said transformer secondary and an associated rectification circuit, said failure alarm element connected to said second transformer secondary section and operable to said second condition only when said second transformer secondary section is provided with power from the transformer primary.

4. The rectifier unit claimed in claim 3 further including a shut down system for interrupting power supply to the transformer primary in response to sensed voltage values at the rectifier unit output which exceed a predetermined value, said shut down system rendered effective by said failure alarm element when in said second condition and rendered ineffective by said failure alarm element when in said first condition.

5. The rectifier unit claimed in claim 1 wherein said failure alarm element comprises an electrically energizable relay having a contact pair, said contact pair connected between an electrically energized alarm device and an electrical power supply for said device and closed when said relay is deenergized.

6. The rectifier unit claimed in claim 5 wherein said electronic controller element comprises an electronic switch and said detector circuit comprises signal producing circuitry coupled to said electronic switch for producing a signal having a value which varies according to conduction of said electronic switch, and an alarm element controller connected in circuit with said alarm element for controlling energization of said alarm element in response to the value of the signal from said signal producing circuitry.

7. A direct current power supply system comprising:
(a) a transformer defining a primary, a secondary and a saturable core, said secondary defining a power section and a control section;
(b) a rectifier circuit associated with said secondary power section so that rectified D.C. is supplied to a load via output terminals;
(c) a resonance control circuit for simulating saturation of said core, said resonance control circuit comprising said secondary control section, a capacitor connected in parallel with said control section to define a tank circuit therewith, and controller means for controllably varying the impedance of said resonance control circuit in response to sensed conditions at said output terminals to simulate saturation of said cores; and,
(d) rectifier failure alarm circuitry operatively connected to said controller means and comprising a rectifier failure alarm element operable between a first condition wherein a rectifier failure alarm is produced and a second condition, said rectifier failure alarm element operated to said first condition when said controller means operates to minimize the rectifier system output.

8. The rectifier system claimed in claim 7 wherein said controller means comprises an electronic switch and an inductor connected in series with said electronic switch, said electronic switch operable between conductive and nonconductive conditions for altering the impedance of said resonance control circuit, said rectifier failure alarm circuitry further comprising detector circuitry for sensing a predetermined conductive condition of said electronic switch and enabling operation of said alarm element from said second to said first condition.

9. The system claimed in claim 8 wherein said element comprises a relay coil and said detector circuitry comprises switching means connected in circuit with said relay coil for enabling and preventing energization of said relay coil.

10. The system claimed in claim 7 wherein said controller means comprises an electronic switch and circuitry for operating said electronic switch in response to sensed voltage and current values at said output terminals.

11. The system claimed in claim 7 further including alarm element energizing circuitry coupling said alarm element to said transformer secondary power section, said energizing circuitry preventing said alarm element from being operated from said first condition when said secondary power section is ineffective.

12. The unit claimed in claim 11 further including a circuit breaker connected in circuit with the transformer primary and operable to disconnect said primary from a power supply and a high voltage shut down circuit for detecting voltage above a predetermined value at said output terminals and operating said circuit breaker, said failure alarm element enabling operation of said circuit breaker when said alarm element is in said second condition.

13. The unit claimed in claim 11 wherein said failure alarm element is in said second condition when electrically energized and in said first condition when deenergized and further including a failure alarm element energizing circuit connecting said failure alarm element to said transformer secondary, said failure alarm element operated to said first condition when said secondary fails to supply power.

14. A power supply system for a D.C. load comprising:
(a) a rechargeable battery having first and second terminals;
(b) at least first and second rectifier units each having a first output terminal electrically connected to one battery terminal and to the load and a second output terminal electrically connected to the other battery terminal and the load, said rectifier units each comprising;
 (i) a ferroresonant transformer including a primary, a secondary and a saturable core;
 (ii) a rectification and filter circuit connected to a section of the transformer secondary to provide full wave rectified, filtered D.C. across said output terminals;
 (iii) ferroresonance control circuitry for controlling the output from said rectifier unit comprising a second section of said transformer secondary, a tank capacitor connected across said second section of said secondary to define a tank circuit therewith, and controller means for altering the effective impedance of said tank circuit to simulate saturation of said core in response to a sensed rectifier unit output condition; and
 (iv) rectifier failure alarm circuitry coupled to said ferroresonance control circuitry for detecting a condition of said ferroresonance control circuitry wherein the output of said rectifier unit is minimized and producing a rectifier failure alarm in response thereto.

* * * * *